United States Patent
Jain et al.

(10) Patent No.: US 11,028,204 B2
(45) Date of Patent: Jun. 8, 2021

(54) CURABLE COMPOSITIONS COMPRISING MONO-FUNCTIONAL ACRYLATES

(71) Applicant: Arkema France, Colombes (FR)

(72) Inventors: Sumeet Jain, Chester Springs, PA (US); William C. Wolf, Philadelphia, PA (US); Yuhong He, Honey Brook, PA (US); Jeffrey A. Klang, West Chester, PA (US)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 15/743,345

(22) PCT Filed: Jul. 7, 2016

(86) PCT No.: PCT/EP2016/066174
§ 371 (c)(1),
(2) Date: Jan. 10, 2018

(87) PCT Pub. No.: WO2017/001918
PCT Pub. Date: Jan. 19, 2017

(65) Prior Publication Data
US 2018/0194885 A1    Jul. 12, 2018

Related U.S. Application Data

(60) Provisional application No. 62/190,872, filed on Jul. 10, 2015.

(51) Int. Cl.
| | |
|---|---|
| *C08F 222/10* | (2006.01) |
| *B33Y 70/00* | (2020.01) |
| *B05D 3/06* | (2006.01) |
| *B05D 3/10* | (2006.01) |
| *C08F 232/08* | (2006.01) |
| *C09D 4/00* | (2006.01) |
| *C09D 4/06* | (2006.01) |

(52) U.S. Cl.
CPC ........ *C08F 222/1006* (2013.01); *B05D 3/067* (2013.01); *B05D 3/068* (2013.01); *B05D 3/108* (2013.01); *B33Y 70/00* (2014.12); *C08F 232/08* (2013.01); *C09D 4/00* (2013.01); *C09D 4/06* (2013.01); *C08F 222/102* (2020.02); *C08F 222/1061* (2020.02); *C08F 222/1065* (2020.02); *C08F 222/1067* (2020.02)

(58) Field of Classification Search
CPC .............. C08F 222/1006; C08F 232/08; C08F 2222/103; C08F 2222/1073; C08F 2222/1086; C08F 2222/1093; C08F 2222/2222; B33Y 70/00; B05D 3/067; B05D 3/068; B05D 3/108; C09D 4/00; C09D 4/06

USPC ........................................................ 427/508
See application file for complete search history.

(56) References Cited

U.S. PATENT DOCUMENTS

2013/0013598 A1 *  1/2013  Kohn ................... H04L 43/022
                                                                        707/736

FOREIGN PATENT DOCUMENTS

| JP | S63196608 A | 8/1988 | |
|---|---|---|---|
| JP | H09183929 A | 7/1997 | |
| JP | 2007076314 | 3/2007 | |
| JP | 2007076314 A * | 3/2007 | |
| JP | 2007161953 A | 6/2007 | |
| JP | 4624894 | 2/2011 | |
| NO | 2014172716 A1 | 10/2014 | |
| WO | WO 2013/013568 | 1/2013 | |
| WO | WO-2013013568 A1 * | 1/2013 | ............... C09J 4/06 |

OTHER PUBLICATIONS

Deepak et al., "Hydrogen Bonding and Rate Enhancement in the Photoinduced Polymerization of Telechelic Urethane Methacrylates Based on a Cycloaliphatic System: Tricyclodecane Dimethanol", (J. Polymer Science: Pt.A: Polymer Chemistry, vol. 44, 4384-4395, (2006)). (Year: 2006).*
Asha et al., "Synthesis and Characterization of Novel Poly(cycloalkyl methacrylate) Bearing Fused-Ring Structure and Its Copolymers", (J. Polymer Science: Pt.A: Polymer Chemistry, vol. 42, 5617-5626, (2004)). (Year: 2004).*
JP2007076314A—machine translation (Year: 2007).*
International Search Report for International Application No. PCT/EP2016/066174. Date of mailing of the International Search Report Aug. 31, 2016.

* cited by examiner

*Primary Examiner* — Ling Siu Choi
*Assistant Examiner* — Ronald Grinsted
(74) *Attorney, Agent, or Firm* — Christopher Lewis

(57) ABSTRACT

Curable compositions include: a) at least one (meth)acrylate monomer or oligomer and b) at least one mono-functional (meth)acrylate monomer comprising a polycyclic moiety having at least three rings that are fused or condensed. The compositions may comprise an initiator system to render the compositions as curable. The compositions may comprise both the a) and b) components in an amount from about 30% to about 70% by weight. The compositions described herein are advantageous with respect to properties such as viscosity, toughness, tensile strength and tensile elongation. Due to their advantageous properties, the compositions are viable for a wide range of applications including coatings, adhesives, sealants, inks and stereolithography. The compositions are liquid at ambient temperature and impart a high glass transition temperature, Tg, without sacrificing other properties, such as elongation. The compositions are useful in 3D printing.

22 Claims, 4 Drawing Sheets

CURABLE COMPOSITIONS COMPRISING MONO-FUNCTIONAL ACRYLATES

CROSS-REFERENCE TO RELATED APPLICATIONS

This application is a U.S. national stage application under 35 U.S.C. § 371 of PCT/EP2016/066174, filed Jul. 7, 2016, which claims benefit to U.S. patent application No. 62/190,872, filed Jul. 10, 2015.

FIELD OF THE INVENTION

Embodiments described herein are directed to curable compositions comprising at least one mono-functional acrylate. Embodiments described herein are also directed to curable compositions comprising: a) at least one (meth)acrylate monomer or oligomer and b) at least one mono-functional (meth)acrylate monomer comprising a polycyclic moiety having at least three rings that are fused or condensed, with a) and b) being different. The curable compositions may comprise component a) in a range of from about 90% to about 10% by weight and component b) in a range of from about 10% to about 90% by weight. The curable compositions described herein are advantageous with respect to properties such as viscosity, toughness, tensile strength and tensile elongation. Due to the advantageous properties, embodiments of the curable compositions described herein are viable for a wide range of applications including coatings, adhesives, sealants, inks and stereolithography.

BACKGROUND OF THE INVENTION

It is well-known in polymer chemistry that mono-functional acrylates do not contribute to cross-link density. Consequently, when contained in a composition, the lack of contribution to cross-link density of mono-functional acrylates results in lowering of the viscosity, toughness and tensile strength of the composition. The lack of contribution to cross-link density of mono-functional acrylates may also result in an increase of tensile elongation of the composition.

SUMMARY OF THE INVENTION

Thus, there is a need for compositions comprising mono-functional acrylates that deviate from such behavior and which display at least satisfactory results with respect to properties such as viscosity, toughness, tensile strength and tensile elongation.

Embodiments of the curable compositions comprising mono-functional acrylates described herein overcome at least some of the drawbacks associated with known compositions comprising mono-functional acrylates.

In embodiments, curable compositions are described which comprise: a) at least one (meth)acrylate monomer or oligomer and b) at least one mono-functional (meth)acrylate monomer comprising a polycyclic moiety having at least three rings that are fused or condensed. In embodiments, the components a) and b) are preferably different from each other and are not the same.

In embodiments, the a) at least one (meth)acrylate monomer or oligomer is selected from the group consisting of multi-functional monomeric (meth)acrylates, multi-functional oligomeric (meth)acrylates, mono-functional monomeric (meth)acrylates, mono-functional oligomeric (meth)acrylates and combinations thereof. In preferred embodiments, the a) at least one (meth)acrylate monomer or oligomer is selected from the group consisting of urethane acrylates, polyester acrylates, epoxy acrylates and combinations thereof.

In particular embodiments, the b) at least one mono-functional (meth)acrylate monomer is selected from the group consisting of monomethacrylate of tricyclodecane methanol, monomethacrylate of tricyclodecane dimethanol, monomethacrylate of dicyclopentadienyl and combinations thereof. In embodiments, the b) at least one mono-functional (meth)acrylate monomer comprises tricycle-[3,2,1,0]-decane. In another embodiment the b) at least one mono-functional (meth)acrylate monomer comprises a tricyclodecyl group or a dicyclopentadienyl group or derivatives thereof.

In embodiments, the b) at least one mono-functional (meth)acrylate monomer comprises tricyclodecane methanol monoacrylate ("TCDMA"), and optionally, at least one compound selected from the group consisting of 3,3,5-trimethyl cyclohexanol acrylate, tertiobutyl cyclohexanol acrylate, isobornyl acrylate, tricyclodecane dimethanol diacrylate ("TCDMDA"), 2-phenoxyethyl acrylate, cyclic trimethylolpropane formal acrylate, trimethylolpropane triacrylate, pentaerythritol triacrylate, triallyl isocyanurate triacrylate ("TAICTA"), 2-(2-ethoxyethoxy) ethyl acrylate, Isodecyl Acrylate (IDA), poly(ethylene glycol) diacrylates and combinations thereof.

In embodiments, the a) at least one (meth)acrylate monomer or oligomer is present in the composition from about 30% to about 70% by weight and the b) at least one mono-functional (meth)acrylate monomer is present in the composition from about 30% to about 70% by weight. As used herein, weight percent is the fraction/weight percent of the total composition which equals 100 (or 100%). In embodiments, the composition includes c) at least one (meth)acrylated monomer having a bicyclic group of at least 7 carbon atoms, or at least 10 carbon atoms.

The said curable composition of the present invention is curable by techniques selected from the group consisting of radiation curable, electron beam curable, peroxide curable, heat curable or combination thereof.

In embodiments, the compositions comprise at least one initiator system in particular comprising (including) at least one photo-initiator or at least one free-radical initiator.

In embodiments, the compositions include at least one photo-initiator and are curable with radiant energy, wherein the photo-initiator may be selected from the group consisting of α-hydroxyketones, phenylglyoxylates, benzyldimethylketals, α-aminoketones, mono-acyl phosphines, bis-acyl phosphines, phosphine oxides, metallocenes and combinations thereof. In embodiments, the at least one photo-initiator may be 1-hydroxy-cyclohexyl-phenyl-ketone.

In embodiments, the compositions do not include any initiator and are curable with electron beam energy. In embodiments, the compositions include at least one free radical initiator and/or accelerator and are curable chemically. The at least one free radical initiator may comprise a peroxide and/or hydro-peroxide and the accelerator may comprise at least one tertiary amine and/or other reducing agents based on metal salts.

In embodiments, the compositions have a viscosity at 25° C. using a rotational cup and bob Brookfield viscometer of less than 4000 mPa·s (cP), or less than 3500 mPa·s (cP), or less than 3000 mPa·s (cP), or less than 2500 mPa·s (cP). The method is the same as specified in the introductory part of the examples.

In embodiments, the a) at least one (meth)acrylate oligomer has an average in number-functionality of from about 1.1 to about 1.9 (meth)acrylates, or from about 1.2 to about 1.8 (meth)acrylates. The curable composition of the invention may further comprise a compound selected from the group consisting of mono- and/or multifunctional monomers, wetting agents, matting agents, colorants (such as dyes or pigments), adhesion promoters, fillers, rheology modifiers, thixotropic agents, plasticizers, UV absorbers, UV stabilizing agents, dispersants, antioxidants, antistatic agents, lubricants, opacifying agents, anti-foam agents or rheology agents and combinations thereof.

More particularly, said curable composition as defined above according to the invention is a curable coating, a curable adhesive, a curable sealant, a curable ink or a curable stereolithography or a curable 3D-impression composition.

The inventions also covers a curable composition comprising:
a) at least one (meth)acrylate monomer or oligomer;
b) at least one mono-functional (meth)acrylate monomer comprises a polycyclic moiety having at least three rings that are fused or condensed;
and
c) at least one initiator system.

The initiator system and components a) and b) of the composition are more particularly as defined above.

It also covers a curable composition consisting essentially of:
a) at least one (meth)acrylate monomer or oligomer;
b) at least one mono-functional (meth)acrylate monomer comprises a polycyclic moiety having at least three rings that are fused or condensed;
and
c) optionally, a compound selected from the group consisting of photo-initiators, free radical initiators, accelerators, mono- and/or multifunctional monomers, wetting agents, matting agents, colorants (e.g., dyes, pigments), adhesion promoters, fillers, rheology modifiers, thixotropic agents, plasticizers, UV absorbers, UV stabilizing agents, dispersants, antioxidants, antistatic agents, lubricants, opacifying agents, anti-foam agents, rheology agents, and the like and combinations thereof.

Another subject of the invention is a cured composition resulting from curing of the said curable composition of the invention as defined above.

It is also a subject covered by the present invention an article (or cured article) which comprises the said cured composition as defined above. More particularly, said article is selected from a coating, an adhesive, a sealant, an ink or a three-dimensional (3D) article made by stereolithography or a 3D-article made by 3D-impression.

It is also part of the invention a 3D-impression, which results from a curable composition of as defined above according to the present invention.

In embodiments, a method of coating a substrate with the compositions described herein the said method comprising the steps of:
i) applying to said substrate the curable composition as defined above according to the present invention and
ii) curing the resulting substrate, in particular by exposure to visible radiation, to UV radiation, to LED radiation, to electron-beam radiation or by exposure to chemicals.

In particular embodiments, the composition may be applied by spraying, by knife coating, by roller coating, by casting, by drum coating, by dipping and combinations thereof.

It is also part of the present invention the use of the curable composition as defined above according to the present invention, in coatings, adhesives, sealants, inks, stereolithography, for three-dimensional articles or in three-dimensional impressions. A specific particular use is in three-dimensional impressions.

In embodiments, coatings, adhesives, sealants, inks, stereolithographies for three-dimensional articles or in three-dimensional impressions may be prepared from the compositions described herein. In embodiments, a cured product may be made or prepared from the compositions described herein. In embodiments, use may be made of the compositions described herein in coatings, adhesives, sealants, inks, stereolithographies for three-dimensional articles or in three-dimensional impressions. In embodiments, the compositions described herein may be cured and comprised in a coating, an adhesive, a sealant, an ink, a stereo-lithograph or a three dimensional impression.

In embodiments, compositions are described which comprise a) at least one (meth)acrylate monomer or oligomer, b) at least one mono-functional (meth)acrylate monomer comprising a polycyclic moiety having at least three rings that are fused or condensed; and c) at least one initiator system.

In embodiments, compositions are described which consist essentially of a) at least one (meth)acrylate monomer or oligomer; b) at least one mono-functional (meth)acrylate monomer comprising a polycyclic moiety having at least three rings that are fused or condensed; and c') optionally, a compound selected from the group consisting of photo-initiators, free radical initiators, accelerators, mono- and/or multifunctional monomers, wetting agents, matting agents, colorants (e.g., dyes, pigments), adhesion promoters, fillers, rheology modifiers, thixotropic agents, plasticizers, UV absorbers, UV stabilizing agents, dispersants, antioxidants, antistatic agents, lubricants, opacifying agents, anti-foam agents, rheology agents, and the like and combinations thereof.

DETAILED DESCRIPTION OF THE INVENTION

Figure 1:
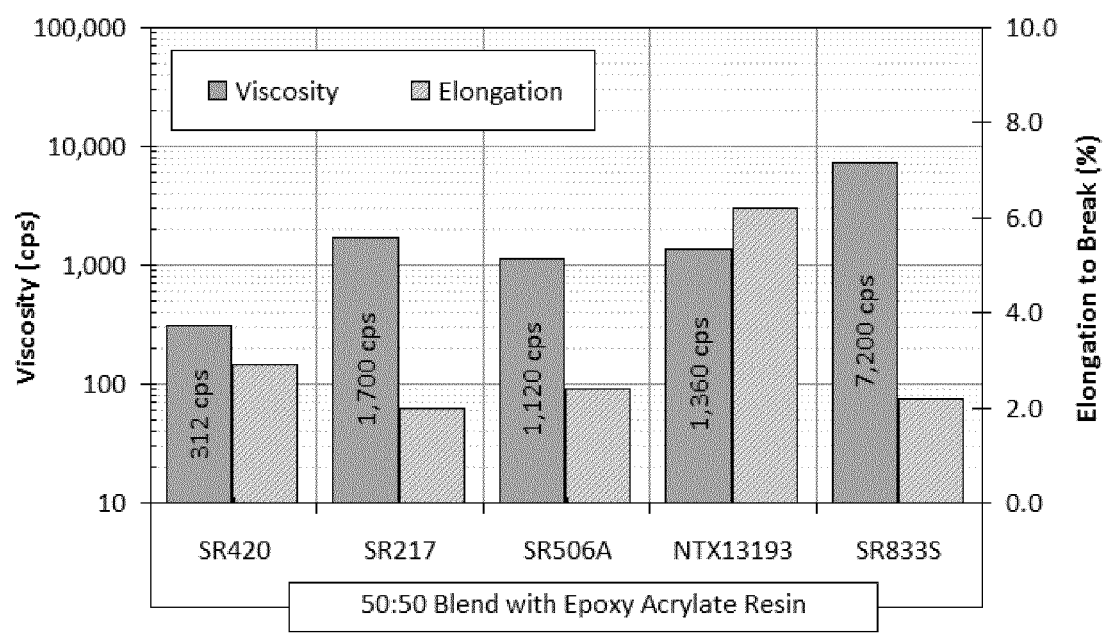
FIG. 1 shows a chart of viscosity (in "cps", meaning cP) and elongation to break (in %) for various 50/50 blends of functional monomers comprising at least cyclic group with epoxy acrylate resins.

Embodiments of the curable compositions described herein have advantageous properties with respect to properties such as viscosity, toughness, tensile strength and tensile elongation. Embodiments of the curable compositions described herein are viable for a wide range of applications including coatings, adhesives, sealants, inks and stereo-lithography (such as three-dimensional articles made by three-dimensional printing, three-dimensional impressions such as a dental impression).

Embodiments of the curable compositions described herein may comprise: a) at least one (meth)acrylate monomer or oligomer and b) at least one mono-functional (meth)acrylate monomer comprising a polycyclic moiety having at least three rings that are fused or condensed. In embodiments, the components a) and b) are preferably different from each other and are not the same.

Embodiments of the curable compositions described herein may also optionally comprise c) other additives, such as an additive selected from the group consisting of photo-initiators, free radical initiators, accelerators, mono- and/or multi-functional monomers, wetting agents, matting agents, colorants (e.g., dyes, pigments), adhesion promoters, fillers, rheology modifiers, thixotropic agents, plasticizers, UV absorbers, UV stabilizing agents, dispersants, antioxidants, antistatic agents, lubricants, opacifying agents, anti-foam agents, rheology agents, and the like and combinations thereof.

A (Meth)Acrylate Monomer or Oligomer

In embodiments, the a) at least one (meth)acrylate monomer or oligomer is not particularly limited and may be selected from the group consisting of multifunctional monomeric (meth)acrylates, multifunctional oligomeric (meth)acrylates, mono-functional monomeric (meth)acrylates, mono-functional oligomeric (meth)acrylates and combinations thereof. In embodiments, the at least one (meth)acrylate monomer or oligomer may be selected from the group consisting of urethane acrylate monomers or oligomers, epoxy acrylate monomers or oligomers, polyester monomers or oligomers, and combinations thereof.

In embodiments, the a) at least one (meth)acrylate monomer or oligomer may be present in the composition of from about 90% to about 10% by weight, or from about 80% to about 20% by weight, or from about 70% to about 30% by weight, or from about 60% to about 40% by weight.

In embodiments, the a) at least one (meth)acrylate oligomer has an average in number-functionality, in (meth)acrylates, of from about 1 to about 2 (meth)acrylates, or from about 1.1 to about 1.9 (meth)acrylates, or from about 1.2 to about 1.8 (meth)acrylates, or from about 1.3 to about 1.7 (meth)acrylates, or less than 2 (meth)acrylates. In some cases, the average in number functionality with respect to terminal (meth)acryloyl groups means that the complement to 2 of the global functionality does correspond to the OH group mean functionality.

B Mono-Functional (Meth)Acrylate Monomer with at Least One Cyclic Group

In embodiments, the b) at least one mono-functional (meth)acrylate monomer comprises a polycyclic moiety having at least three rings that are fused or condensed; and may be selected from the group consisting of mono-methacrylate of tricyclodecane methanol, mono-methacrylate of tricyclodecane dimethanol, mono-methacrylate of dicyclopentadienyl and combinations thereof. In embodiments, the b) at least one mono-functional (meth)acrylate monomer comprises tricycle-[3,2,1,0]-decane, a tricyclodecyl group, a dicyclopentadienyl group or derivatives thereof.

In embodiments, the b) at least one mono-functional (meth)acrylate monomer may comprise two or three monomers or more. In embodiments, the b) at least one mono-functional (meth)acrylate monomer comprises TCDMA as the sole component or the TCDMA may be optionally combined with at least one other mono-functional monomer selected from the group consisting of 3,3,5-trimethyl cyclohexanol acrylate (TMCHA), tertiobutyl cyclohexanol acrylate (TBCHA), isobornyl acrylate (IBOA), tricyclodecane dimethanol diacrylate (TCDMDA), 2-phenoxyethyl acrylate (2-PEA), cyclic trimethylolpropane formal acrylate (CTFA), trimethylolpropane triacrylate (TMPTA), pentaerythritol triacrylate (PETA), triallyl isocyanurate triacrylate (TA-ICTA), 2-(2-ethoxyethoxy) ethyl acrylate (EOEOEA), Isodecyl Acrylate (IDA), poly(ethylene glycol) diacrylates (PEGDA) and the like and combinations thereof. The additional functional monomers may be combined with TCDMA in ratios that range from about 10:1 to about 1:10.

In embodiments, the b) at least one mono-functional (meth)acrylate monomer may be present in the composition of from about 90% to about 10% by weight, or from about 80% to about 20% by weight, or from about 70% to about 30% by weight, or from about 60% to about 40% by weight.

C Other Additives

In embodiments, the compositions described herein may optionally comprise other additives, such as an additive selected from the group consisting of photo-initiators, free radical initiators, accelerators, mono- and/or multi-functional monomers, wetting agents, matting agents, colorants (e.g., dyes, pigments), adhesion promoters, fillers, rheology modifiers, thixotropic agents, plasticizers, UV absorbers, UV stabilizing agents, dispersants, antioxidants, antistatic agents, lubricants, opacifying agents, anti-foam agents, rheology agents, and the like and combinations thereof.

In embodiments, the compositions described herein further include d) at least one (meth)acrylated monomer having a bicyclic group of at least 7 carbon atoms, or at least 10 carbon atoms. In embodiments, the at least one (meth)acrylate monomer having a bicyclic group of at least 7 carbon atoms, or at least 10 carbon atoms may comprise tricyclodecane dimethanol diacrylate ("TCDMDA"). The at least one (meth)acrylated monomer having a bicyclic group of at least 7 carbon atoms, or at least 10 carbon atoms may be present in the composition at from about 1% to about 50% by weight, or from about 2% to about 35% by weight, or from about 3% to about 25% by weight, or from about 4% to about 15% by weight, or from about 5% to about 10% by weight.

In embodiments, sufficient amounts of an initiator system may be optionally included in the compositions described herein. The initiator system may comprise components that allow for the compositions including the initiator system to be cured with radiant energy, to be cured with electron beam energy and/or to be cured chemically. In embodiments, the compositions comprise the initiator system.

In embodiments, sufficient amounts of an initiator system comprising at least one photo-initiator may be optionally included in the compositions described herein so as to render the compositions curable with radiant energy. Preferably, the compositions may include from about 0.1% by weight to about 20% by weight of the initiator system, preferably about 5% to about 15% by weight. Suitable photo-initiators for use in the compositions described herein may include compounds selected from the group consisting of α-hydroxyketones, phenylglyoxylates, benzyldimethylketals, α-aminoketones, mono-acyl phosphines, bis-acyl phosphines, phosphine oxides, metallocenes and combinations thereof. In embodiments, the at least one photo-initiator may be 1-hydroxy-cyclohexyl-phenyl-ketone.

In embodiments, the compositions described herein do not comprise any initiator and are rendered curable with electron beam energy.

In embodiments, sufficient amounts of an initiator system comprising at least one free radical initiator and/or accelerator may be optionally included in the compositions described herein so as to render the compositions as chemically curable. Preferably, the compositions may include from about 0.1% by weight to about 20% by weight of the initiator system, preferably about 5% to about 15% by weight. Suitable free radical initiators for use in the compositions described herein may include peroxides and hydroperoxides and suitable accelerators may include tertiary amines or other reducing agents based on metal salts and the use of such initiators may be defined as cure or curing by exposure to chemicals or a chemical cure or curing. Such chemical curing may also take place at lower temperatures when using accelerators.

FIG. 1 shows a chart of viscosity (in cps) and elongation to break (in %) for various 50%/50% by weight blends of functional monomers comprising at least cyclic group with epoxy acrylate resins. The various functional monomers are SR420 (e.g., 3,3,5-trimethyl cyclohexanol acrylate (TMCHA)), SR217 (e.g., tertiobutyl cyclohexanol acrylate (TBCHA)), SR506A (e.g., isobornyl acrylate (IBOA)), NTX13193 (e.g., TCDMA according to the invention) and SR833S (e.g., tricyclodecane dimethanol diacrylate-TCDMDA). Of these monomers, only SR833S is di-functional and the others are mono-functional. In FIG. 1, the viscosities are listed in the data that corresponds to the viscosities. As can be seen from FIG. 1, the 50%/50% by weight blend of epoxy acrylate resins and NTX13193 provides the highest combination of viscosity and elongation to break.

Figure 2:
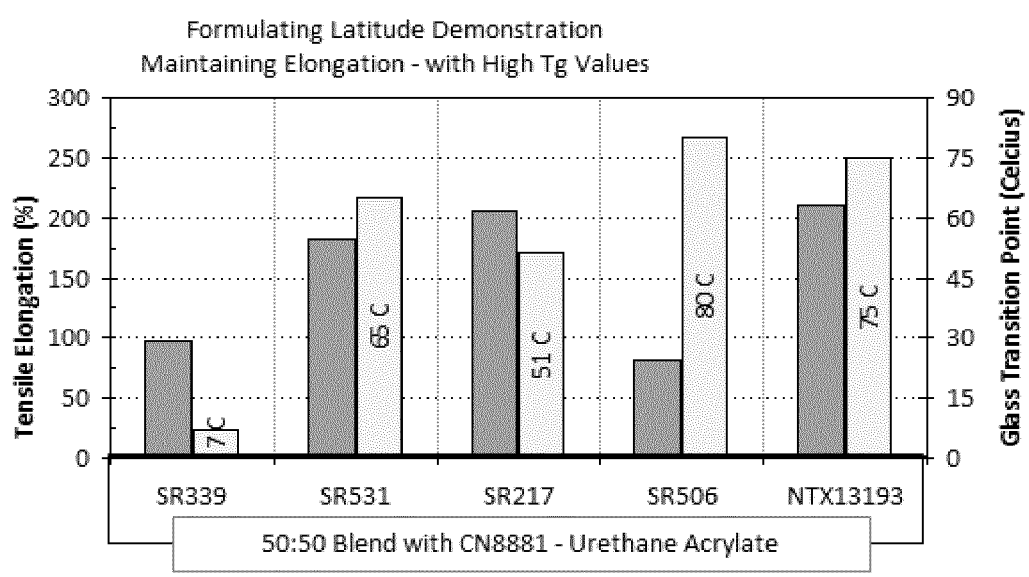
FIG. 2 shows a chart of tensile elongation (in %) and glass transition temperature (in ° C.) for various 50/50 blends of functional monomers comprising at least cyclic group with urethane acrylate resins.

FIG. 2 shows a chart of tensile elongation (in %) and glass transition temperature (in ° C.) for various 50%/50% by weight blends of functional monomers comprising at least cyclic group with urethane acrylate resins. The various functional monomers are SR339 (e.g., 3,3,5-trimethyl cyclohexanol acrylate (TMCHA)), SR531 (e.g., cyclic trimethylolpropane formal acrylate (CTFA)), SR217 (e.g., 2-phenoxyethyl acrylate (2-PEA)), SR506A (e.g., isobornyl acrylate (IBOA)) and NTX13193 (e.g., TCDMA). All of these monomers are mono-functional. In FIG. 2, the glass transition temperatures are listed in the data that corresponds to the glass transition temperatures. As can be seen from FIG. 2, the 50%/50% by weight blend of epoxy acrylate resins and NTX13193 provides the highest combination of tensile elongation and glass transition temperature.

Figure 3:
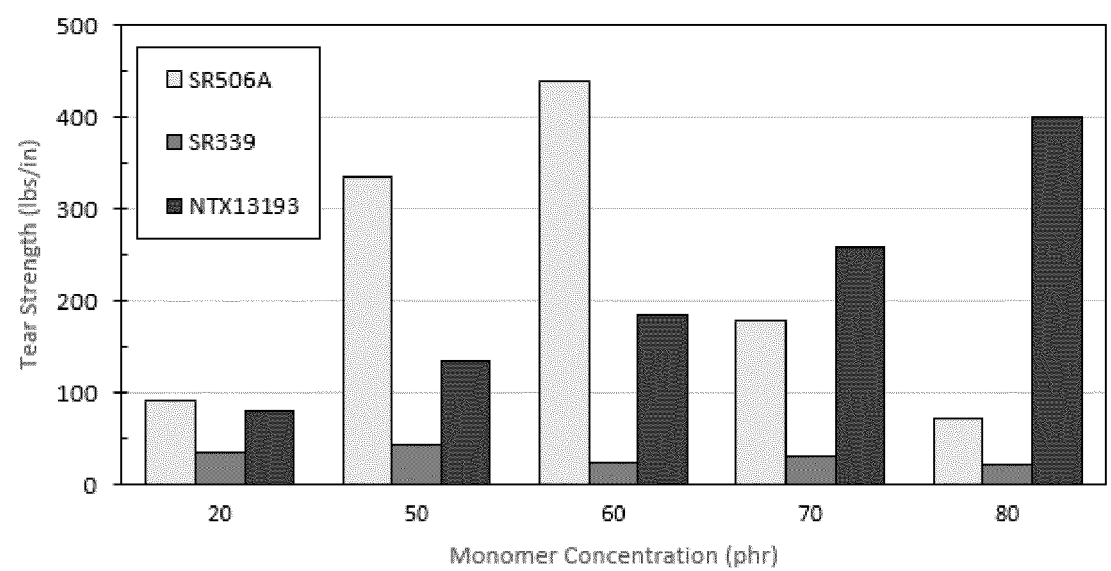
FIG. 3 shows a chart of tear strength (in lbs/in) vs. diluent concentration for mono-functional monomers comprising at least cyclic group mixed with urethane acrylate resins.

FIG. 3 shows a chart of tear strength (in lbs/in) vs. diluent (monomer) concentration for the monomers SR506A (e.g., isobornyl acrylate (IBOA)), SR339 (e.g., 3,3,5-trimethyl cyclohexanol acrylate (TMCHA)) and NTX13193 (e.g., TCDMA) mixed with same urethane acrylate resins. All three of the monomers (diluents) are mono-functional. In FIG. 3, data are grouped together in groups of threes with SR506A reported on the left, SR339 reported in the middle and NTX13193 reported on the right. As can be seen from FIG. 3, the tear strength for NTX13193 increases as a function of diluent concentration whereas the tear strength for SR506 and SR339 decreases as a function of diluent concentration.

Figure 4:
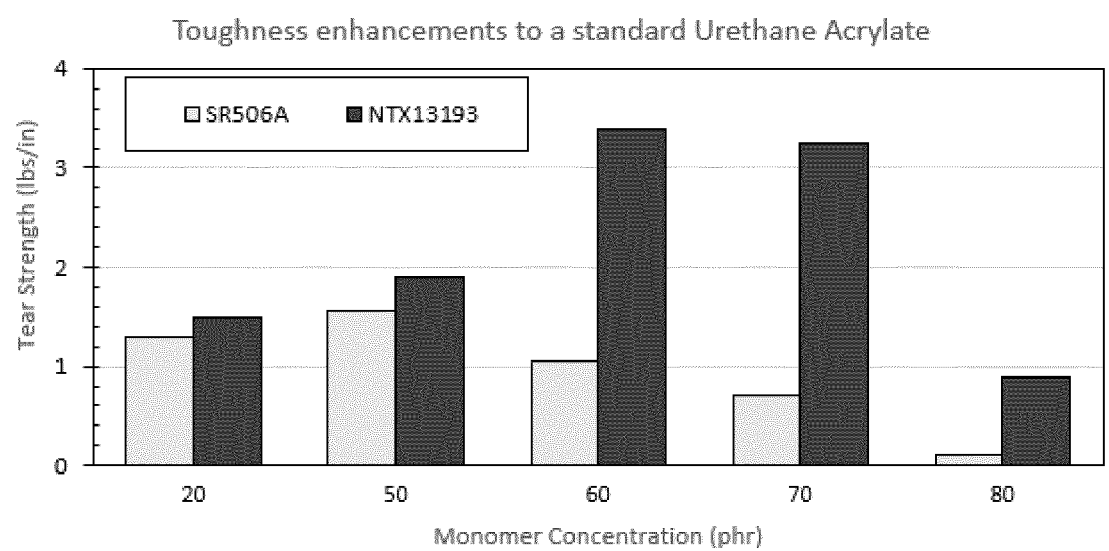
FIG. 4 shows a chart of toughness (energy to break in ft-lbs) vs. diluent concentration for mono-functional monomers comprising at least cyclic group mixed with urethane acrylate resins.

FIG. 4 shows a chart of toughness (energy to break in ft-lbs) vs. diluent (monomer) concentration for the monomers SR506A (e.g., isobornyl acrylate (IBOA)) and NTX13193 (e.g., TCDMA) mixed with same urethane acrylate resins. Both of these monomers are mono-functional. In FIG. 4, data are grouped together in groups of twos with SR506A reported on the left, and NTX13193 reported on the right. As can be seen from FIG. 4, the toughness for NTX13193 is higher as a function of diluent (monomer) concentration than that of SR506A as a function of diluent concentration.

In embodiments, the compositions described herein may impart a high glass transition temperature, Tg, without sacrificing the compositions tensile elongation properties when cured and enhance viscosity reduction over other similar materials once cured. The compositions described herein may have a Tg of at least about 70° C. when cured, or at least about 80° C. when cured. Tg is determined using DSC where a shift in the materials heat capacity is identified as it goes from a glassy to amorphous state. Samples were allowed to equilibrate at −100° C. and then heated at a ramp rate of 10° C./min up to 200° C. The value was taken at the inflection point of the resulting heat flow versus temperature plot. The compositions described herein may also have increased tensile strength, and by extension, an increased resistance to tearing when cured. The compositions described herein may also have low odor or no odor at all when cured.

In embodiments, the compositions are liquid at ambient temperature with a viscosity (method of determination as defined in the introductory part of the Examples) of less than 4000 cP (mPa·s), or less than 3500 cP (mPa·s), or less than 3000 cP (mPa·s) or less than 2500 cP (mPa·s). The compositions may have viscosities of from about 500 cP (mPa·s) to about 4000 cP (mPa·s), or of from about 1000 cP (mPa·s) to about 3000 cP (mPa·s) or from about 1500 cP (mPa·s) to about 2500 cP (mPa·s).

It is also a subject of the present invention the use of the curable composition according to the invention as defined above, in coatings, adhesives, sealants, inks in particular in inks for inkjet printing or for multi-jet printing, in stereolithography, in three-dimensional articles or in three-dimensional impressions in particular for bottom-up or top-down 3D printing, in digital printing and additive manufacturing.

More particularly, said use is in three-dimensional impressions for bottom-up or top-down 3D printing or in stereo-lithography or in inks for inkjet printing or for multi-jet printing or (use) in digital printing.

Coatings, Films, Sealants & Adhesives

Such viscosity features facilitates spreading of the compositions described herein, for example on a substrate, for application as coatings, films, sealants and adhesives. The compositions may be applied in any known conventional manner, for example, by spraying, knife coating, roller coating, casting, drum coating, dipping, and the like and combinations thereof. Indirect application using a transfer process may also be used. A substrate may be any commercially relevant substrate, such as a high surface energy substrate or a low surface energy substrate, such as a metal substrate or plastic substrate, respectively. The substrates may comprise stainless steel, paper, cardboard, glass, polyolefins, composites and wood.

In embodiments, methods of applying the compositions described herein may comprise coating the compositions, for example on a substrate, and curing the compositions. The coating may take place at ambient temperature or near ambient temperature, such as in the range of 10-35° C. Once applied, the compositions may be cured. Curing techniques are not particularly limited and may include techniques that expose the compositions to polymerization accelerators. Such techniques may include exposure to radiant energy such as visible radiation, UV radiation, and LED radiation or by exposure to electron-beam radiation, or by exposure to chemicals.

In embodiments, and once a layer of the compositions described herein have been applied, for example to a substrate, the layer may be exposed to radiant energy (e.g., UV light, visible light and/or LED light) or to electron beam energy or to chemicals for a time effective to cause cross-linking of the a) at least one (meth)acrylate monomer or oligomer and b) at least one mono-functional (meth)acrylate monomer comprising at least one cyclic group to cure the applied compositions. The intensity and/or wavelength may be adjusted as desired to achieve the desired extent of curing. The time period of exposure is not particularly limited, so long as the time period is effective to cure the compositions into a viable article. Time frames for exposure to energy to cause sufficient cross-linking is not particularly limited and may be from at least about 2 minutes, or at least about 5 minutes, or at least about 10 minutes, or at least about 15 minutes, or at least about 20 minutes.

Inks and Stereo-Lithography

The compositions described herein are well-suited for use as inks and in stereo-lithographic applications. The compositions described herein may be used as ink in three-dimensional printing applications. For example, the compositions described herein may be disposed in a suitable container of a three-dimensional printer and used in a three-dimensional printing process to form a three-dimensional article. Once three-dimensional printing with the compositions described herein is carried out, the resulting three-dimensional article may be cured using the curing techniques described herein.

Three-Dimensional Impressions

The compositions described herein are well-suited for use in three-dimensional impressions. For instance, the compositions described herein may be disposed in a mold and used to form a three-dimensional impression. One such application in three-dimensional impressions is in dental impressions. The compositions described herein may be disposed in a mold for taking dental impressions. Once the impression is created, the article may be cured using the curing techniques described herein.

EXAMPLES

The Examples using the compositions described herein report properties related to viscosity, tensile strength, tensile elongation and Young's modulus. The properties reported for the Examples were determined using a number of known techniques. Viscosities were determined with a Brookfield viscometer (25° C.) with a #27 spindle at 50 rpm. The tensile measurements were determined in accordance with ASTM D638. The compositions of the Examples were cast into a sheet and Type IV style dog-bone specimens were punched out. The specimens were allowed to equilibrate for at least 24 hours at 50% RH and 70° F. (21.1° C.) before testing. For tensile strength, the maximum stress on the sample before breaking was observed. For tensile elongation, the strain at the break point was observed. For Young' modulus, the slope of stress strain curves at 1% strain was observed.

Example 1

The ingredients and their proportions (in wt %), for Example 1 is provided below in Table 1 along with the corresponding properties related to viscosity, tensile strength, tensile elongation and Young's modulus.

TABLE 1

Ingredients and Properties of Example 1

Composition

| Ingredient | Amount (%) |
|---|---|
| Urethane Acrylate Oligomer | 40 |
| TCDMA | 30 |
| SR833S | 30 |

Properties

| Test | Value |
|---|---|
| Viscosity | 1740 cP (mPa · s) |
| Tensile Strength | 5100 psi (35.16 MPa) |
| Tensile Elongation | 30% |
| Young's modulus | 67 psi (0.462 MPa) |

Example 2

The ingredients, and their proportions (in wt %), for Example 2 is provided below in Table 2 along with the corresponding properties related to viscosity, tensile strength, tensile elongation and Young's modulus.

TABLE 2

Ingredients and Properties of Example 2

Composition

| Ingredient | Amount (%) |
|---|---|
| Polyester Acrylate Oligomer | 40 |
| TCDMA | 30 |
| SR833S | 30 |

Properties

| Test | Value |
|---|---|
| Viscosity | 2370 cP (mPa · s) |
| Tensile Strength | 4850 psi (33.44 MPa) |
| Tensile Elongation | 12% |
| Young's modulus | 74 psi (0.510 MPa) |

Example 3

The ingredients, and their proportions (in wt %), for Example 3 is provided below in Table 3 along with the corresponding properties related to viscosity, tensile strength, tensile elongation and Young's modulus.

TABLE 3

Ingredients and Properties of Example 3

Composition

| Ingredient | Amount (%) |
|---|---|
| Epoxy Acrylate Oligomer | 50 |
| TCDMA | 50 |

TABLE 3-continued

Ingredients and Properties of Example 3

Properties

| Test | Value |
| --- | --- |
| Viscosity | 1360 cP |
| Tensile Strength | 6100 psi (42.06 MPa) |
| Tensile Elongation | 6% |
| Young's modulus | 127 psi (0.876 MPa) |

As can been seen, Examples 1-3 produced films that demonstrate good properties with respect to viscosity, tensile strength, tensile elongation and Young's modulus. The viscosities ranged from about 1350 cP (mPa·s) to about 2400 cP (mPa·s). The tensile strength ranged from about 4800 psi (33.10 MPa) to about 6100 psi (42.06 MPa). The tensile elongation ranged from about 6% to about 30%. The Young's modulus ranged from about 65 psi (0448 MPa) to about 130 psi (0.896 MPa).

Product under reference NTX13193 tested in FIGS. 1 to 4 is a product according to the invention like the one disclosed in Example 3.

When the word "about" is used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages.

It will now be apparent that new, improved, and nonobvious compositions have been described in this specification with sufficient particularity as to be understood by one of ordinary skill in the art. Moreover, it will be apparent to those skilled in the art that modifications, variations, substitutions, and equivalents exist for features of the compositions which do not materially depart from the spirit and scope of the embodiments disclosed herein. Accordingly, it is expressly intended that all such modifications, variations, substitutions, and equivalents which fall within the spirit and scope of the invention as defined by the appended claims shall be embraced by the appended claims.

The invention claimed is:

1. A curable composition comprising:
   a) at least one (meth)acrylate or oligomer selected from the group consisting of monofunctional oligomeric (meth)acrylates, multifunctional oligomeric (meth)acrylates, and combinations thereof;
   b) at least one mono-functional (meth)acrylate monomer comprising tricyclodecane methanol monoacrylate having three rings that are fused or condensed; and wherein a) and b) are different.

2. The curable composition of claim 1, wherein the b) at least one mono-functional (meth)acrylate monomer comprises tricyclo-[5,2,1,0]-decane.

3. The curable composition of claim 1, wherein the composition further includes d) at least one (meth)acrylated monomer having a bicyclic group having at least 7 carbon atoms.

4. The curable composition of claim 1, wherein the composition is curable by techniques selected from the group consisting of radiation curable, electron beam curable, peroxide curable, heat curable or combination thereof.

5. The curable composition of claim 1, wherein the composition includes c) at least one initiator system.

6. The curable composition of claim 1, wherein the a) at least one (meth)acrylate monomer or oligomer is present in the composition from about 30% to about 70% by weight based on the total weight of the composition and the b) at least one mono-functional (meth)acrylate monomer is present in the composition from about 30% to about 70% by weight based on the total weight of the composition.

7. The curable composition of claim 1, wherein the composition has a viscosity of less than 4000 mPa·s (cP) at 25° C.

8. The curable composition of claim 1, wherein the a) at least one (meth)acrylate oligomer has an average in number-functionality of from about 1.1 to about 1.9 (meth)acrylates.

9. The curable composition of claim 1, wherein the composition further comprises a compound selected from the group consisting of mono- and/or multifunctional monomers, wetting agents, matting agents, colorants (such as dyes or pigments), adhesion promoters, fillers, rheology modifiers, thixotropic agents, plasticizers, UV absorbers, UV stabilizing agents, dispersants, antioxidants, antistatic agents, lubricants, opacifying agents, anti-foam agents or rheology agents and combinations thereof.

10. The curable composition of claim 1, wherein the composition is a curable coating, a curable adhesive, a curable sealant, a curable ink or a curable stereolithography or a curable 3D-impression composition.

11. A cured composition resulting from curing the curable composition of claim 1.

12. A cured article comprising the cured composition of claim 11.

13. The cured article of claim 12, wherein the article is selected from a coating, an adhesive, a sealant, an ink or a three-dimensional (3D) article made by stereolithography or a 3D-article made by 3D-impression.

14. A 3D-impression resulting from a curable composition of claim 1.

15. A method of coating a substrate comprising the steps of:
   applying to said substrate the curable composition of claim 1; and
   curing the resulting substrate by exposure to one of visible radiation, UV radiation, LED radiation, electron-beam radiation or chemicals.

16. The method of claim 15, wherein the applying comprises applying to a substrate by spraying, by knife coating, by roller coating, by casting, by drum coating, by dipping and combinations thereof.

17. A method for preparing a coating, an adhesive, a sealant, an ink, a stereo-lithography, a three-dimensional article or a three-dimensional impression, a digital printing and an additive comprising curing the curable composition of claim 1.

18. A method of preparing a three-dimensional for bottom-up comprising curing the curable composition of claim 1.

19. The curable composition of claim 1 further comprising at least one compound selected from the group consisting of 3,3,5-trimethyl cyclohexanol acrylate, tert-butyl cyclohexanol acrylate, isobornyl acrylate, tricyclodecane dimethanol diacrylate, 2-phenoxyethyl acrylate, cyclic trimethylolpropane formal acrylate, trimethylolpropane triacrylate, pentaerythritol triacrylate, triallyl isocyanurate triacrylate, 2-(2-ethoxyethoxy) ethyl acrylate, isodecyl acrylate, poly(ethylene glycol) diacrylates and combinations thereof.

20. The curable composition of claim 1, wherein the monofunctional oligomeric (meth)acrylates, multifunctional oligomeric (meth)acrylates, and combinations thereof are selected from the group consisting of urethane acrylate oligomers, epoxy acrylate oligomers, polyester acrylate oligomers, and combinations thereof.

21. The curable composition of claim 1, wherein the a) at least one (meth)acrylate oligomer is present in the composition from about 10% to about 90% by weight based on the total weight of the composition and the b) at least one mono-functional (meth)acrylate monomer is present in the composition from about 10% to about 90% by weight based on the total weight of the composition.

22. The curable composition of claim 1 further comprising tricyclodecane dimethanol diacrylate.

* * * * *